(12) United States Patent
Mackenroth

(10) Patent No.: US 8,262,115 B2
(45) Date of Patent: Sep. 11, 2012

(54) VARIABLE HEIGHT AND LATERAL POSITION SUSPENSION SEAT POST ASSEMBLY

(76) Inventor: Joshua D. Mackenroth, San Diego, CA (US)

( * ) Notice: Subject to any disclaimer, the term of this patent is extended or adjusted under 35 U.S.C. 154(b) by 4 days.

(21) Appl. No.: 12/619,680

(22) Filed: Nov. 17, 2009

(65) Prior Publication Data
US 2010/0187870 A1    Jul. 29, 2010

Related U.S. Application Data

(60) Provisional application No. 61/115,112, filed on Nov. 17, 2008, provisional application No. 61/162,316, filed on Mar. 22, 2009.

(51) Int. Cl.
*B62J 1/02* (2006.01)
(52) U.S. Cl. .................... 280/283; 280/275; 297/209
(58) Field of Classification Search .......... 280/274, 280/283, 275, 288.4; 248/219.2, 408; 297/195.1, 297/209; 267/132
See application file for complete search history.

(56) References Cited

U.S. PATENT DOCUMENTS

| | | | | |
|---|---|---|---|---|
| 2,949,153 | A * | 8/1960 | Hickman | 248/585 |
| 5,236,169 | A * | 8/1993 | Johnsen | 248/561 |
| 5,236,170 | A * | 8/1993 | Johnsen | 248/578 |
| 5,346,235 | A * | 9/1994 | Holman | 280/226.1 |
| 5,704,626 | A * | 1/1998 | Kesinger | 280/220 |
| 6,186,487 | B1 * | 2/2001 | Kesinger | 267/249 |
| 6,409,130 | B1 * | 6/2002 | Maret | 248/219.2 |
| 6,581,919 | B2 * | 6/2003 | Barefoot et al. | 267/132 |
| 6,988,740 | B2 * | 1/2006 | Bobrovniczky | 280/276 |
| 7,144,029 | B1 * | 12/2006 | Heady | 280/288.4 |
| 7,422,224 | B2 * | 9/2008 | Sicz et al. | 280/274 |
| 7,681,899 | B2 * | 3/2010 | Fujiwara | 280/283 |

* cited by examiner

*Primary Examiner* — Tony Winner

(57) ABSTRACT

A variable height seat bicycle suspension seat post assembly for bicycles that descends at an angle toward the rear of the bicycle while providing a suspension component to the seat post. The downward angle at which the seat post assembly travels lowers the rider's center of gravity and improves the balance, stability, handling characteristics, and traction of the bicycle while at the same time absorbing shocks and other impacts caused by rough terrain.

1 Claim, 11 Drawing Sheets

VARIABLE HEIGHT AND LATERAL POSITION SUSPENSION SEAT POST ASSEMBLY

CROSS-REFERENCE TO RELATED APPLICATIONS

Two previous provisional applications entitled "VARIABLE HEIGHT SUSPENSION SEAT POST ASSEMBLY" were filed on Nov. 17, 2008 (Application No. 61/115,112) and Mar. 22, 2009 (Application No. 61/162,316). This application claims the benefit of these prior applications.

STATEMENT REGARDING FEDERALLY SPONSORED RESEARCH

Not applicable

THE NAMES OF PARTIES TO JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

1. Technical Field

This invention relates in general to bicycle seat suspension and in particular to a shock-absorbing, seat post assembly that lowers the bicycle's center of gravity while riding.

2. Background Art

The prior art in the field of bicycle suspension seat posts can essentially be divided into two basic design categories: (1) a spring loaded linear design, similar in function to a pogo stick, that incorporates two telescoping tubes that compress straight downward utilizing an internal or external spring, or other shock absorbing material, such as those disclosed in U.S. Pat. Nos. 7,422,224 B2; 6,581,919 B2; 6,186,487 B1; 5,704,626; 5,236,170 and 5,236,169; or (2) a cantilever style design that allows the seat to pivot downwards toward the rear of the bicycle, such as those disclosed in U.S. Pat. Nos. 5,833,255; 5,346,235; U.S. Pat. No. 6,409,130 B1 and 5,833,255.

Previous efforts to develop practical and reliable suspension seat posts have been marginally successful, and have been the subject of two product safety recalls due to cracks in the seat post assembly. (See, generally Consumer Product Safety Commission Alert #02-208, Cane Creek "Thudbuster" Model, Jul. 24, 2002; Consumer Product Safety Commission Alert #5-543, Cannondale 1-X Bicycle Suspension Seat Post, Feb. 18, 2005). As a result, cantilever and pogo stick style seat posts designed for mountain bikes have never fully been accepted as part of the mainstream in the mountain biking community due to their complexity and unreliability.

While providing a suspension component in their design, no known pogo stick design allows the seat to move both down and backwards toward the rear of the bicycle. While the above mentioned pogo stick designs contemplate a means for adjusting the rate of tension on the internal suspension spring, none of the pogo stick designs utilize an adjustable hydraulic suspension damping shock to control the spring rebound rate (i.e. the rate of speed the shock spring returns to its fully extended position after being compressed) as the preferred embodiment does.

Of the four cantilever designs mentioned above, two incorporate an elastic polymer suspension component but have no spring. (U.S. Pat. Nos. 6,409,130 B1 and 5,833,255). Another cantilever design, U.S. Pat. No. 6,270,065 B1, incorporates a spring shock absorber at the center of the cantilever mounts instead of an elastic polymer. U.S. Pat. No. 6,270,065 B1 includes a means for adjusting the rate of tension on the internal suspension spring and contemplates the use of an internal damping shock to control the spring rebound, however its inventor concludes the use of a hydraulic damping shock is not essential for the invention. The preferred embodiment of this invention differs in that it utilizes both a spring and a hydraulic damping shock.

Another functional disadvantage of the cantilever design as opposed to the present embodiment is the cantilever design's scissor-like manner of compression, posing the hazard of crushed fingers or other small body parts to users during operation. The complexity of the motion of this design and the large number of components likewise increase the chance of product failure.

BRIEF SUMMARY OF THE INVENTION

The present embodiment combines the benefits of the pogo stick and cantilever suspension seat post designs with shock absorption qualities and a lower center of gravity, but without the limitations of its predecessors. The preferred embodiment allows for the vertical movement of the assembly with shock absorbing qualities similar to the pogo stick designs. In addition, by incorporating a rearward facing angle in relation to the bicycle frame, the seat post assembly travels backwards toward the rear of the bicycle frame similar to the cantilever design, a motion the pogo stick design cannot do. The simplicity of the preferred embodiment's design in comparison to the complex motions and large number of components in the cantilever design makes the preferred embodiment much more reliable and easy to maintain.

The preferred embodiment's gives the rider the ability to lower the seat down and back at will while in motion, enabling a more aggressive riding style and the ability to corner harder, sharper, and faster whether it be on the pavement or off road. The suspension assembly's shock absorption enhances the comfort of the rider while reducing the impacts of the hard corners and rough terrain. The use of a steering damper configuration eliminates the need for an external oil reservoir, resulting in a reduction in weight in comparison to traditional shock absorbers.

DETAILED DESCRIPTION OF THE INVENTION

The preferred embodiment of the variable height seat post suspension assembly comprise of two main components: The first component is the lower mount assembly that houses a damping device, a guide rod spring, a bearing through which the guide rod travels, and an optional internal locking mechanism connected to a remote control cable system. The optional locking mechanism consists of a pull pin that is attached to a cable and held in place with a spring. The lower mount attaches to a standard seat post at approximately a forty degree angle from the horizontal position for insertion into the seat tube opening within the frame of a bicycle. The second component is the upper mount assembly. The lower portion of this component houses the guide rod and provides a proper seat for the guide rod spring and a means of attaching the piston rod of a damping device. The top portion of the upper mount is shaped to accommodate a standard bicycle seat mounting bracket.

Although the description provided herein relates to an embodiment as presently contemplated, including suggested materials and specific measurements of size, positioning and degree of angles, it will be understood that the invention in its broadest aspect may include mechanical, material and functional equivalents of the elements described herein that accomplish the same objectives.

Figure 1:
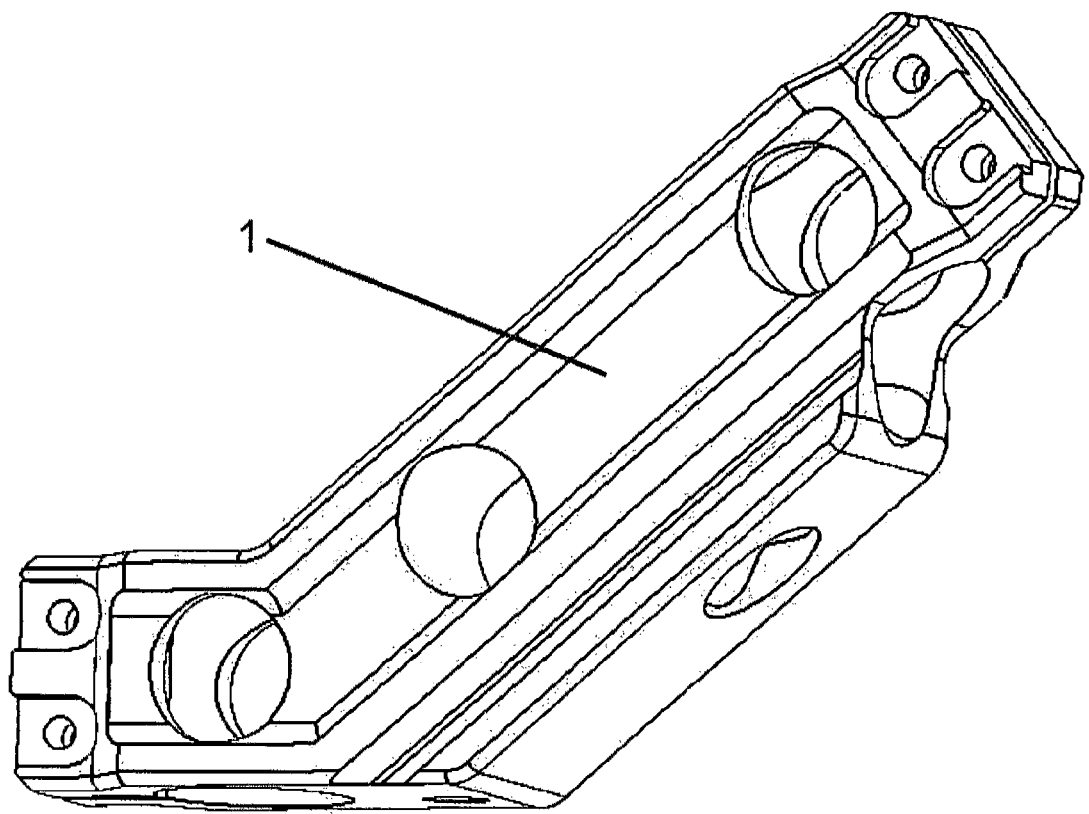
FIG. 1 is a side view lower mount.

FIG. 1 is a three dimensional view of lower mount 1, which is preferably fabricated out of a light weight, yet strong material, such as aircraft grade aluminum. Holes in opposite ends of lower mount 1 allow the insertion of a seat post tube 4 at one end, and a damping device 2 at the other. Each of these holes is split vertically at the outer ends creating a gap, and one or more holes are drilled perpendicular to the direction of the gap, allowing one or more bolts to be placed through lower mount 1 and tightened, clamping the seat post tube 4 and the damping device 2 securely. The seat post tube must be of sufficient size to slide into the seat post hole at the top of a bicycle frame, and serves as a replacement for the existing seat post. Lower mount 1 is angled upwards at approximately a 0.7 rad (40° angle) from a horizontal position near the insertion point of the damping device, forming the elbow shaped bend as depicted in FIG. 1.

Figure 2:
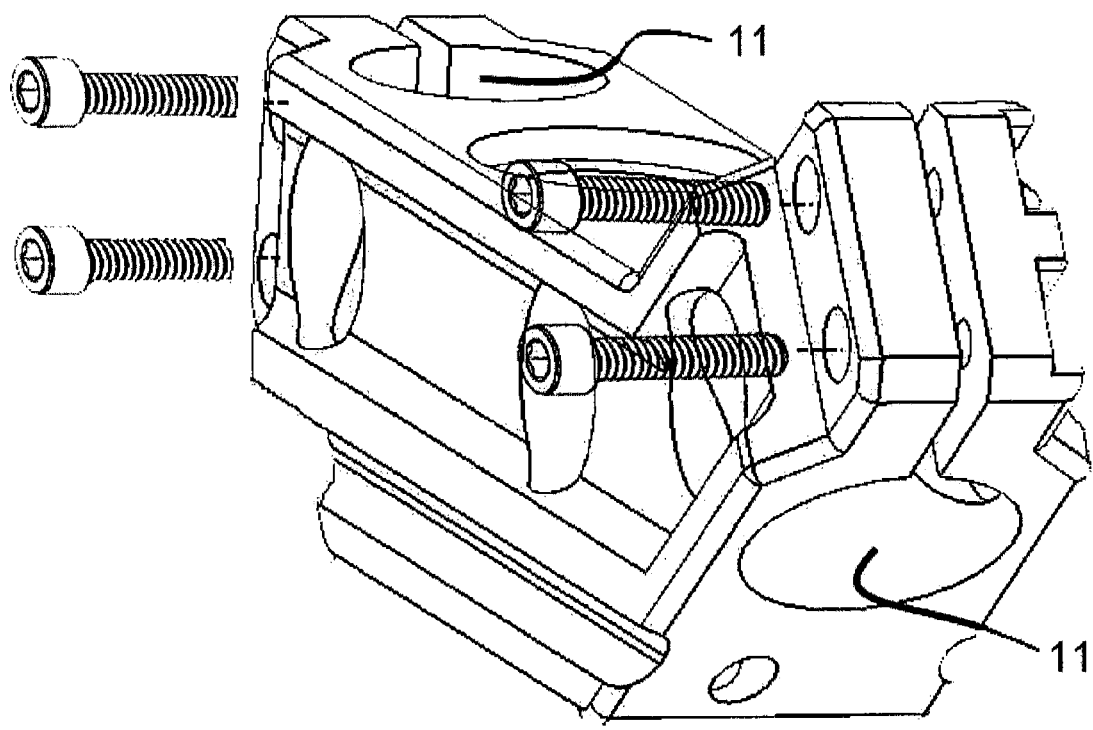
FIG. 2 is a frontal view of lower mount.

FIG. 2 is a frontal view of lower mount 1 depicting the bisected circular holes 11 at either end of lower mount 1. When bolts are placed through the bolt holes, a clamping effect is created that will hold the damping device and the seat post tube in place, respectively.

Figure 3:
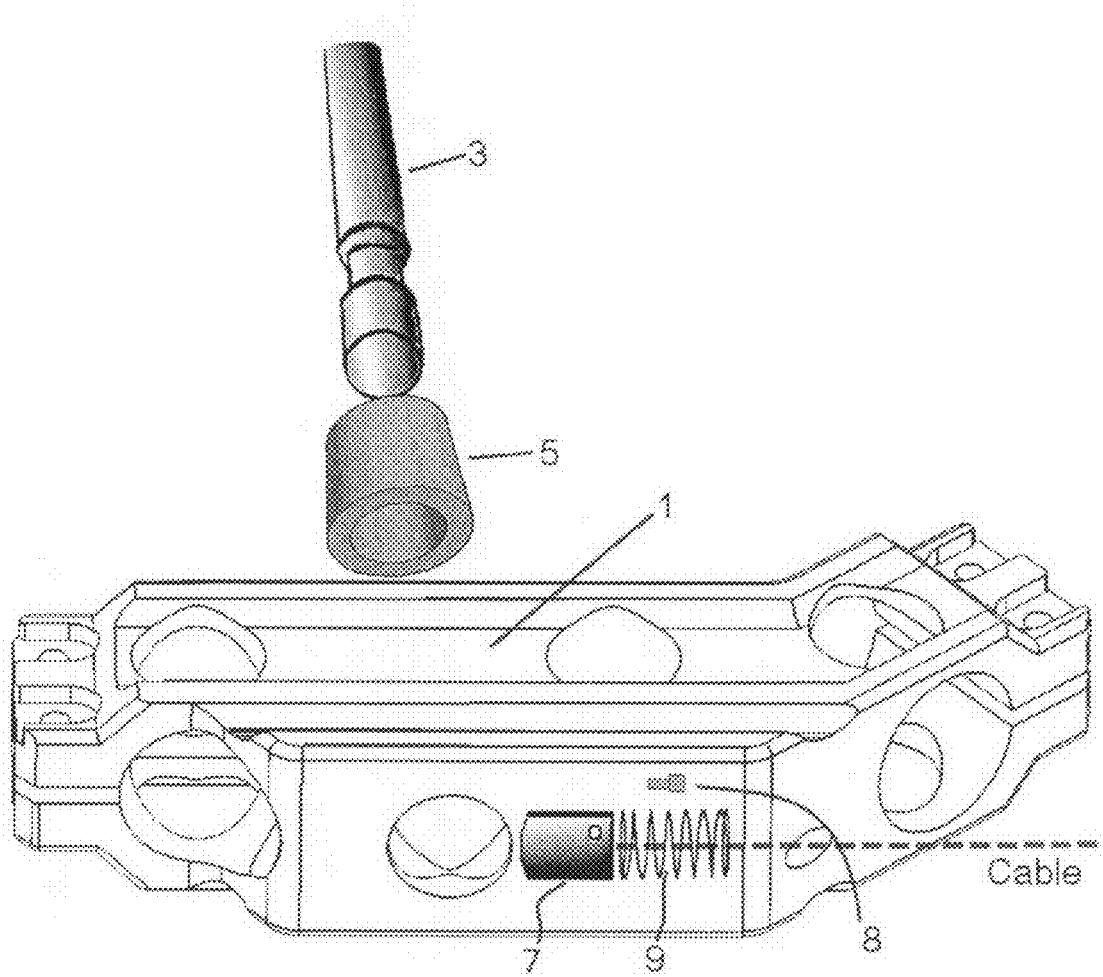
FIG. 3 is a perspective view of the lower mount depicting pull pin assembly and exploded view of guide rod and bushing assembly.

FIG. 3 is an exploded view of lower mount 1 depicting the function of the pull pin 7 and is connected to a remote control cable system. Pull pin 7 slides laterally inside lower mount 1 along an internal cylindrical chamber of sufficient size to allow pull pin 7 to slide freely. The internal cylindrical chamber does not extend completely through the front of lower mount 1, but does intersect the central hole in lower mount 1 where guide rod 3 passes through. Toward the front portion of the internal cylindrical chamber, pull pin 7 and spring 9 is seated. Pull pin 7 is positioned immediately to the rear of spring 9, so that pull pin 7 rides on top of spring 9. A cable is inserted into a hole drilled in the front end of pull pin 7 traveling approximately ½ the length of pull pin 7, and another hole is drilled and threaded perpendicular to the hole containing the cable, such that the holes intersect and are perpendicular to each other. Pull-pin screw 8 is inserted and tightened down, thereby holding the cable in place securely. The cable is routed out of a hole in the front of lower mount 1 and connects to a remote lever that is operated by the rider. Bushing 5 is pressed into a hole toward the center of lower mount 1 allowing guide rod 3 to slide through with minimal friction. The preferred embodiments require no more than 0.00005 m (0.002 in) of tolerance between guide rod 3 and bushing 5, so as to minimize the amount of play between the two surfaces.

Figure 4:
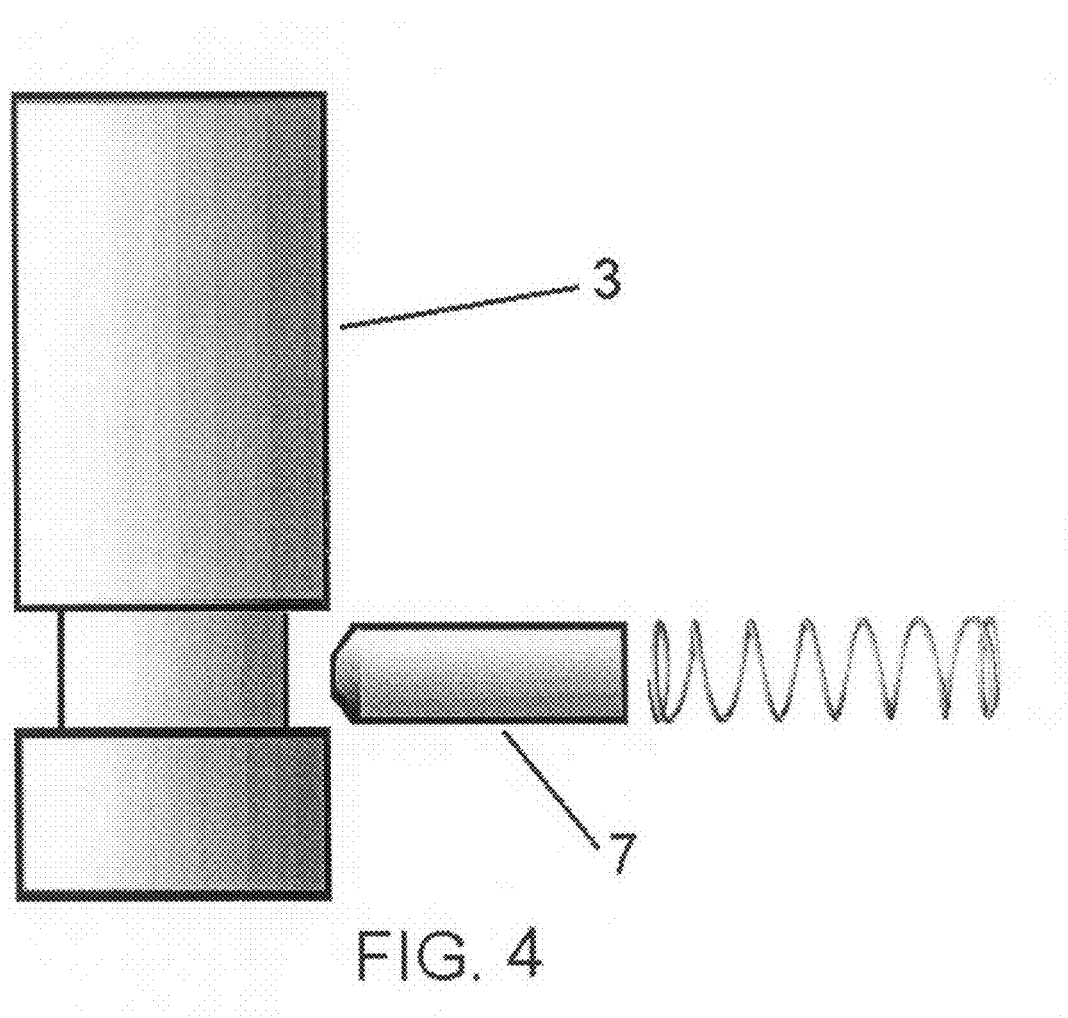
FIG. 4 is a close up of pull pin positioned to seat within the groove in the guide rod.

The guide rod 3 can be configured in two ways. One embodiment incorporates a 0.003 m (⅛ in) deep groove, approximately 0.008 m (⅓ in) from the bottom of the guide rod. The width of the groove will be slightly larger than the diameter of pull pin 7, allowing pull pin 7 to fit into the groove snugly. A close-up of this embodiment is seen in FIG. 4. Alternatively, no groove is cut into guide rod 3.

Figure 5:
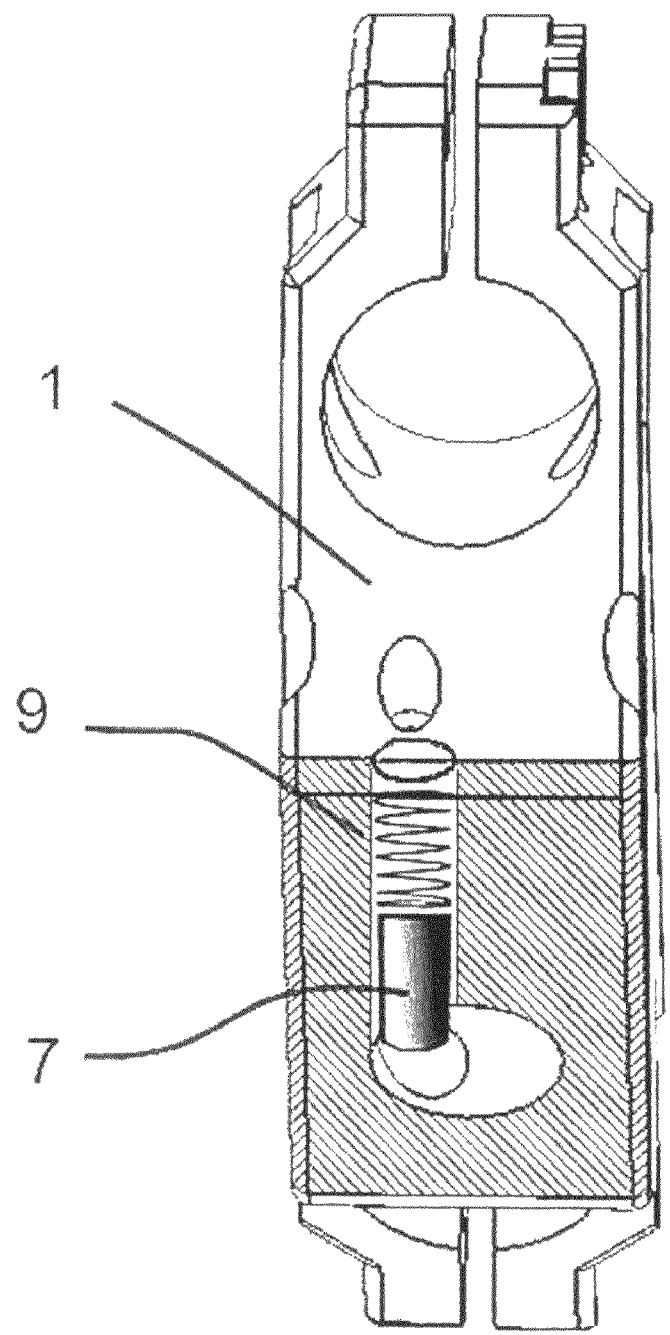
FIG. 5 is an overhead view of lower mount with cross section of pull pin assembly.

FIG. 5 is a frontal view of lower mount 1. Here, the exit hold for the cable can be seen, along with an expanded view of pull pin 7 and spring 9, which are housed inside the cylindrical chamber of lower mount 1 as discussed above.

Figure 6:
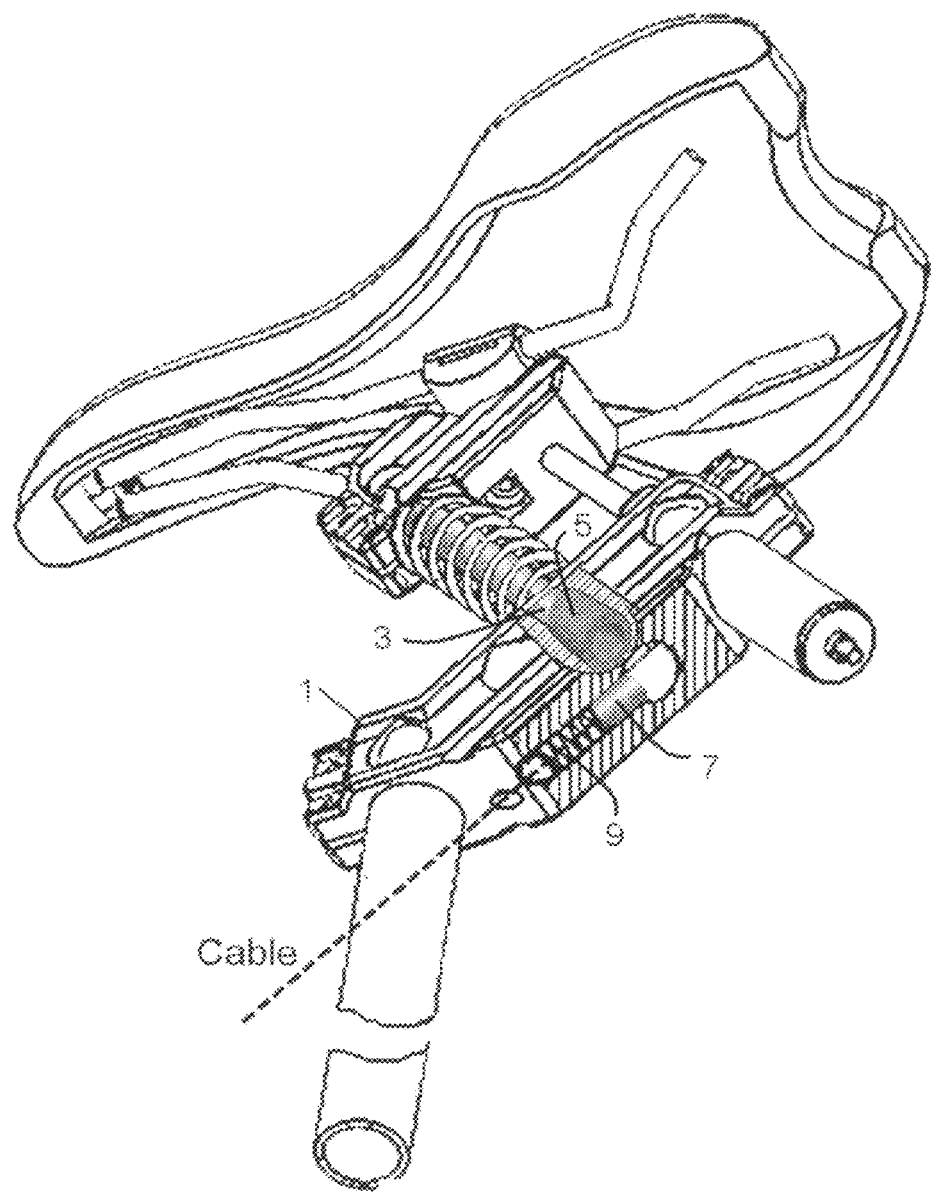
FIG. 6 is a perspective view from the bottom of the preferred embodiment with a cross-sectional view.

FIG. 6 depicts the preferred embodiment looking from the bottom up. Guide rod 3 extends through bushing 5 and comes to rest on top of pull pin 7, which is positioned inside a groove in guide rod 3. Pull pin 7 is held in place by the force of spring 9, which defaults to the extended position. This is considered the upright fixed position of the seat post assembly. Pull pin 7 prohibits guide rod 3 from sliding downwards until a cable that is attached to pull pin 7 and connected to a brake lever mounted on the bicycle handlebars which is operated by the rider. When the brake lever is pulled, pull pin 7 is retracted into the cylindrical internal chamber toward the front of lower mount 1. When pull pin 7 is completely retracted, guide rod 3 is released and descends downwards at approximately a 40 degree angle from horizontal toward the rear of the bicycle due to the weight of the rider on the seat. This causes upper mount 10, to which a bicycle seat is attached, to drop in height and move in a lateral direction toward the rear of the bicycle.

Figure 7:
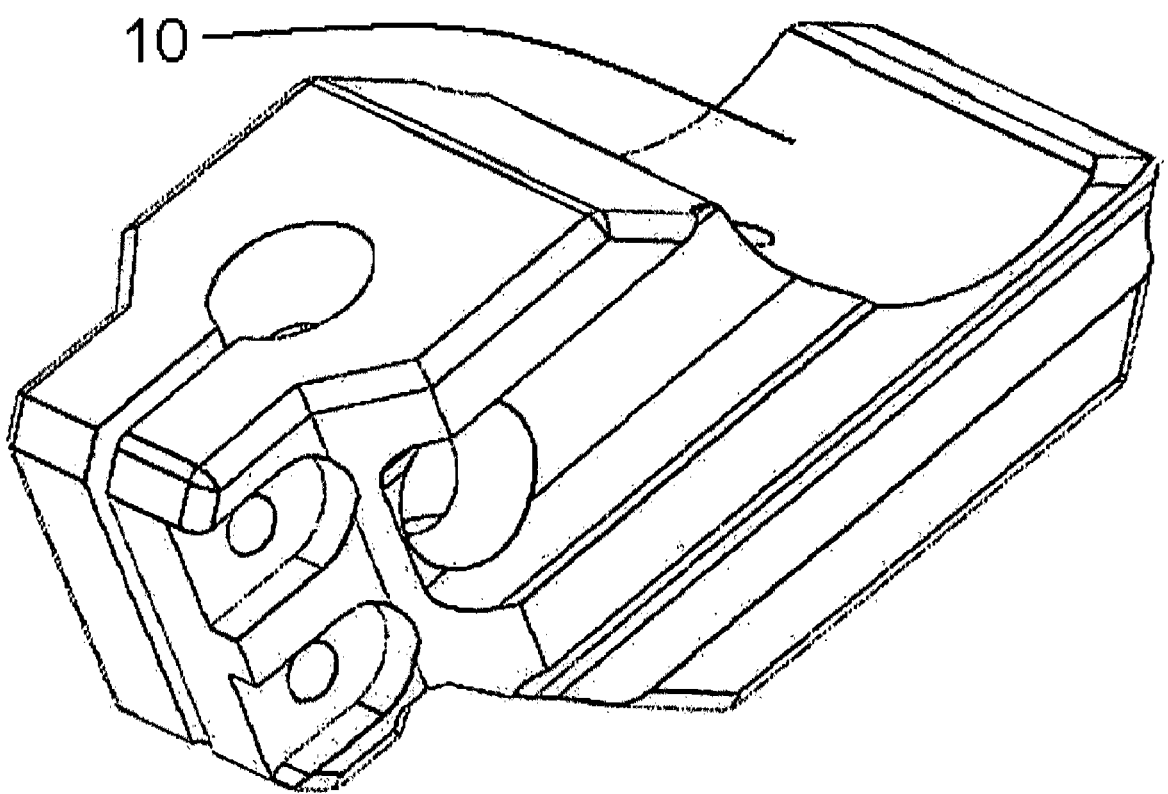
FIG. 7 is a perspective view of the upper mount.

FIG. 7 depicts upper mount 10. A vertical gap bisecting the front edge creates a clamping effect when bolts are inserted through horizontal holes passing through the gap and tightened.

Figure 8:
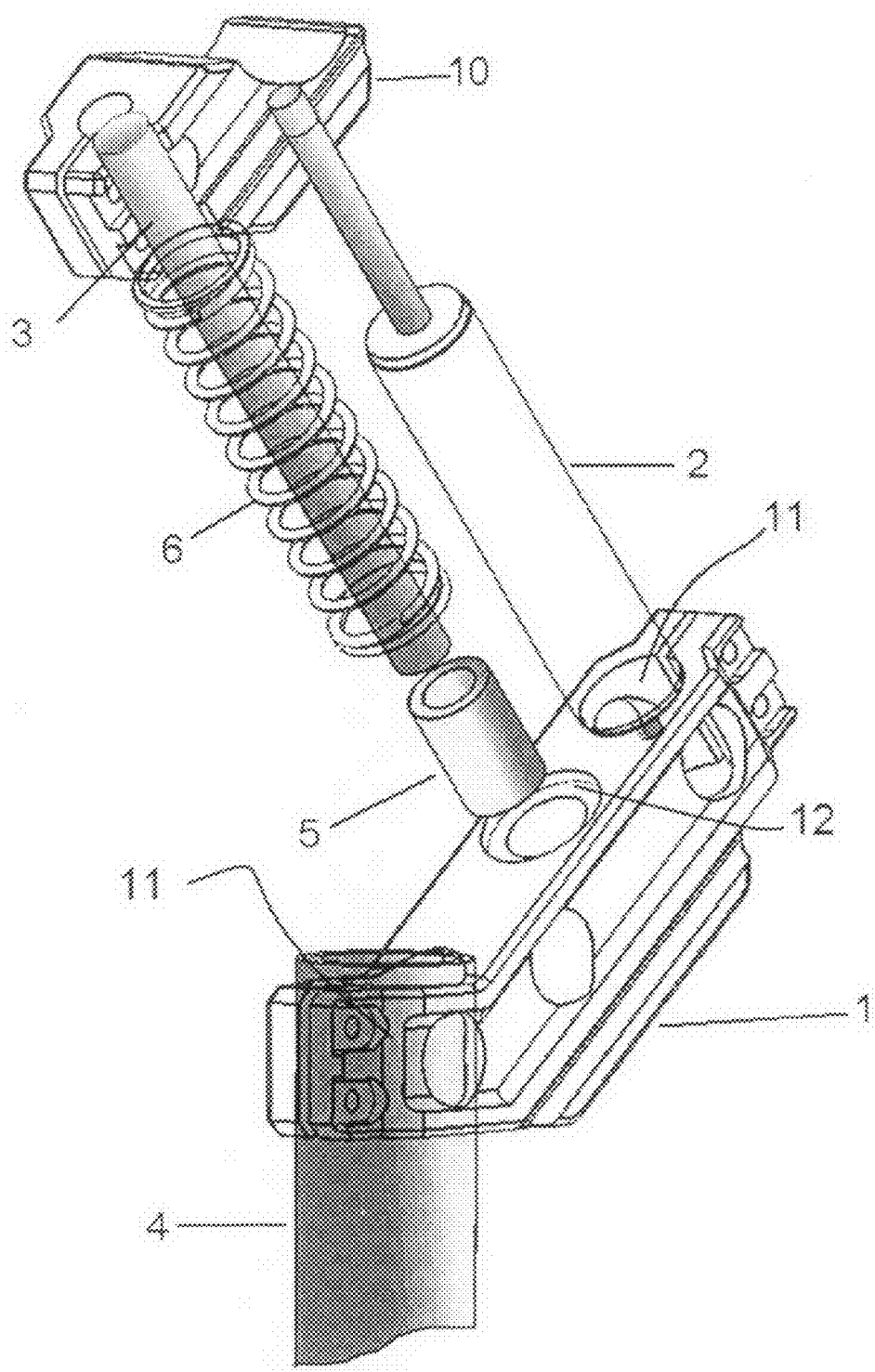
FIG. 8 is an exploded view of the preferred embodiment from a frontal perspective.

FIG. 8 is a side view which depicts the assembly of the preferred embodiment. Seat post tube 4 is inserted into the bisected circular hole 11 located at the front of lower mount 1 and held in place with bolts. Damping device 2 is inserted into the bisected circular hole 11 at the rear of lower mount 1 and held in place with bolts. Bushing 5 is placed into the guide rod hole located at the center of lower mount 1 and pressed into place. Guide rod 3 is inserted into the front hole of upper mount 10 and held in place by the clamping effect created when two bolts are placed in the holes and tightened. The piston rod of damping device 2 is screwed into the threaded hole located at the rear of upper mount 10. Guide rod 3 is fitted lengthwise with guide rod spring 6 and inserted through bushing 5. Guide rod spring 6 is seated in a recessed circular section 12 of the hole located in the center of lower mount 1 through which guide rod 3 passes, and at the opposite end is seated in upper mount 10 in a recessed groove. A bolt is inserted through a hole at the bottom of upper mount 10, and threads into a standard seat mounting bracket.

Figure 9:
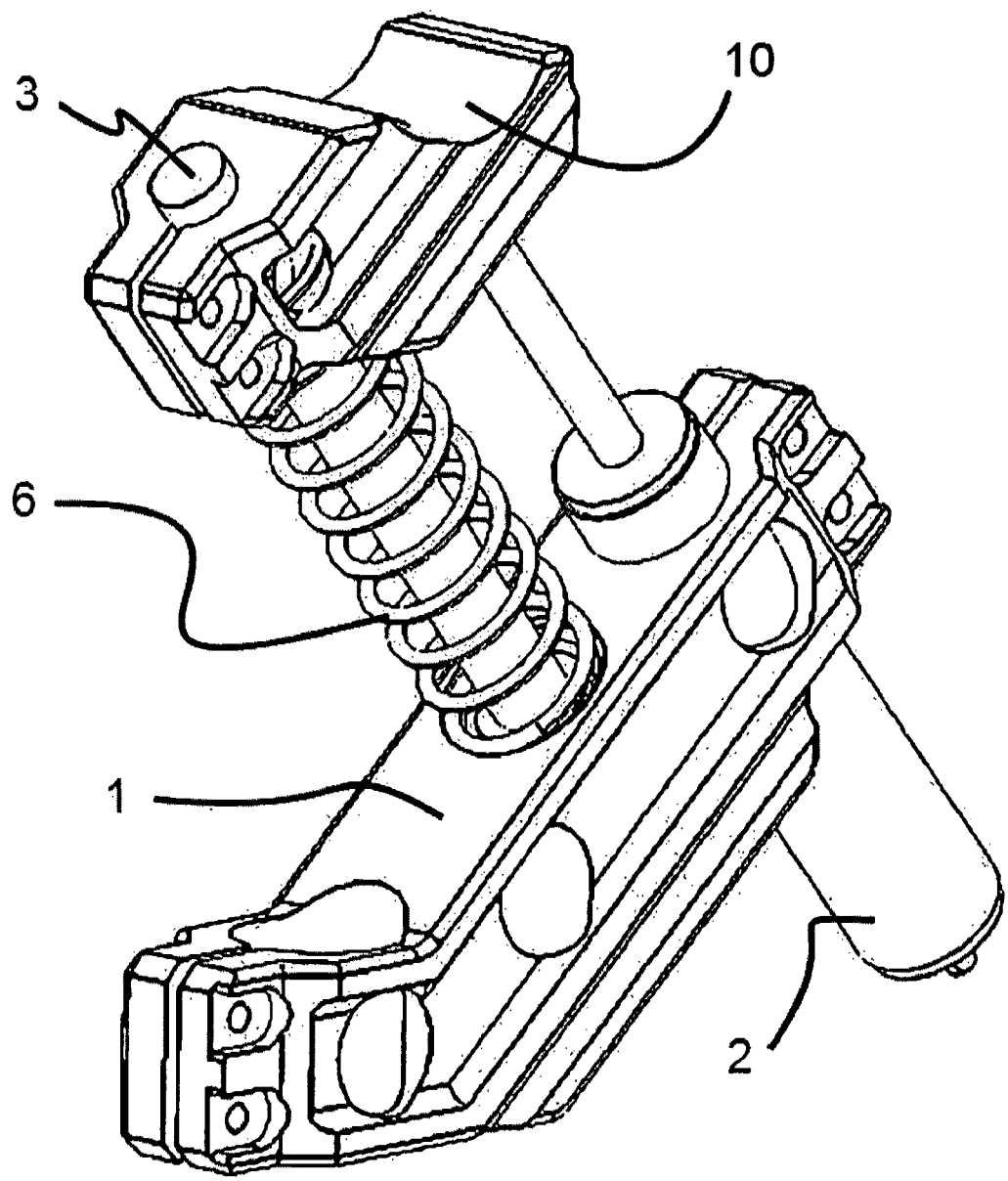
FIG. 9 is a perspective view of the preferred embodiment assembled.

FIG. 9 is a depiction of the preferred embodiment in its assembled form prior to attachment to a standard bicycle seat.

Figure 10:
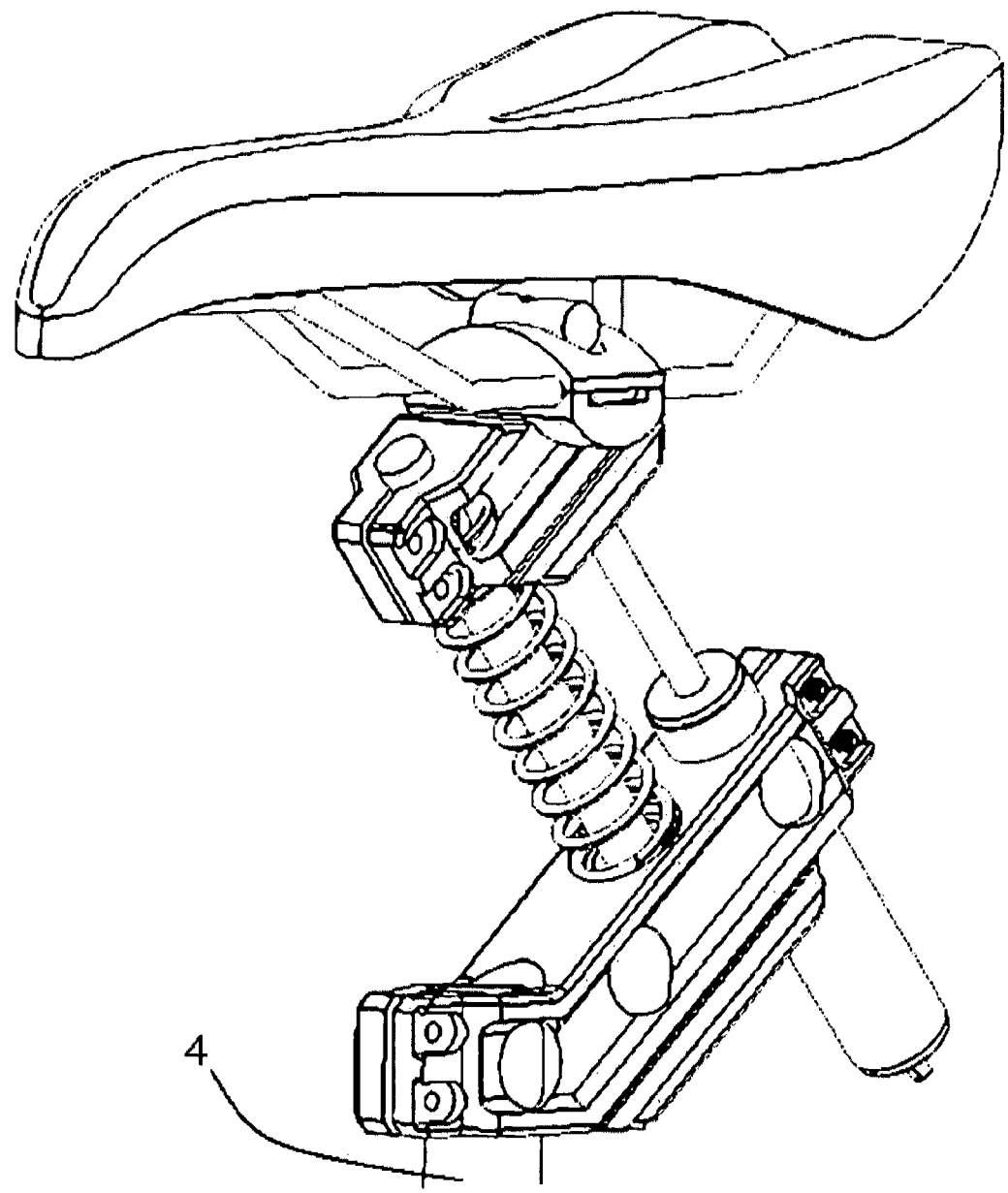
FIG. 10 is a perspective view of the preferred embodiment assembled with seat attached.

FIG. 10 depicts the preferred embodiment with seat post tube 4 and as it would appear attached to a bicycle seat, ready for insertion into the frame of a bicycle.

Figure 11:
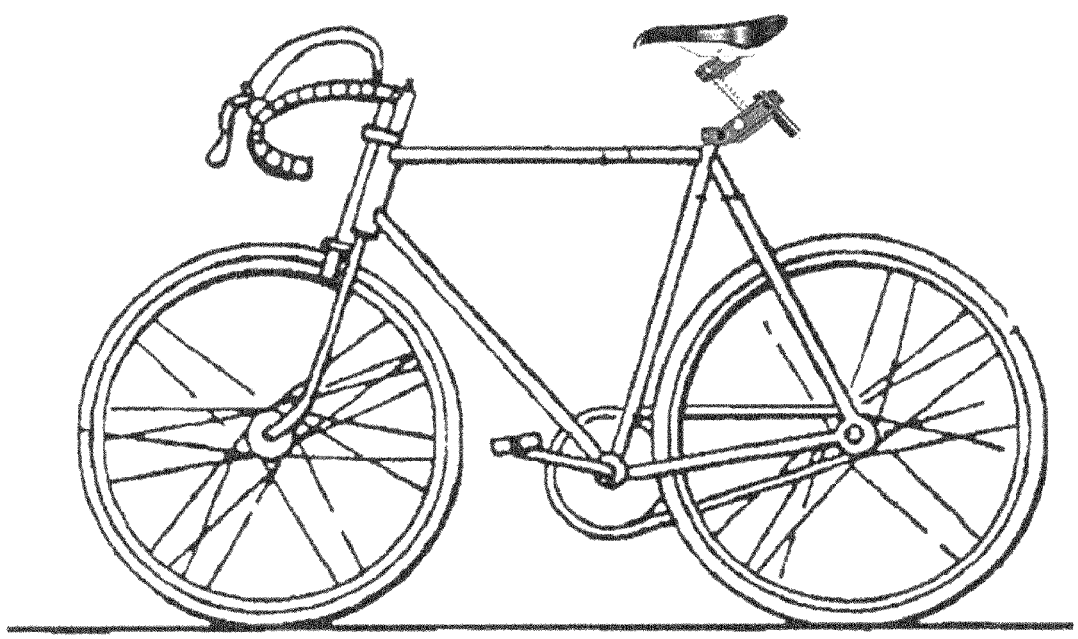
FIG. 11 is a side view of the preferred embodiment as it would appear mounted on a bicycle.

FIG. 11 depicts the preferred embodiment assembled and inserted into the frame of a standard road bicycle.

What is claimed is:

1. A shock absorbing bicycle seat post mount assembly for attaching a bicycle seat to a bicycle frame that alters the height and lateral position of the bicycle seat on command by traveling downward at an angle toward the rear of the bicycle, said seat post mount assembly comprising:
   a. an upper mount assembly having a damping device and a guide rod attachable thereto, said upper mount to accommodate an attachment of a bicycle seat;
   b. said guide rod including a guide rod spring;
   c. a lower mounts assembly comprising:
      i. a lower mount having a seat post tube attachable thereto, first and second ends of said lower mount with an upward bend located between the two ends at approximately 40° degrees from a horizontal position;
      ii. a center hole with a recessed circular section for seating the guide rod spring;
      iii. bisected circular holes are located at both ends for housing the damping device and seat post tube;
      iv. a bushing is placed in the center hole as a means of reducing friction caused by a sliding of said guide rod through said lower mount;
      v. an elongated channel is located on the lower surface and an internal pull pin that slides along the channel for locking the guide rod in a fixed position; wherein a cable, controlled by a rider, is attached to the pull pin for locking/unlocking said guide rod, allowing said upper mount assembly to slide downward and rearward toward the rear of said bicycle frame, thereafter returning to a fixed upward position through means of the guide rod spring, wherein said upper mount assembly locks in place.

* * * * *